United States Patent
Lim et al.

(10) Patent No.: US 9,117,005 B2
(45) Date of Patent: *Aug. 25, 2015

(54) STATISTICS COLLECTION USING PATH-VALUE PAIRS FOR RELATIONAL DATABASES

(75) Inventors: Lipyeow Lim, North White Plains, NY (US); George Andrei Mihaila, Yorktown Heights, NY (US); Min Wang, Cortiandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 891 days.

This patent is subject to a terminal disclaimer.

(21) Appl. No.: 12/341,309

(22) Filed: Dec. 22, 2008

(65) Prior Publication Data

US 2010/0161930 A1 Jun. 24, 2010

Related U.S. Application Data

(63) Continuation of application No. 11/435,353, filed on May 16, 2006.

(51) Int. Cl.
*G06F 17/00* (2006.01)
*G06F 17/30* (2006.01)
(52) U.S. Cl.
CPC .... *G06F 17/30935* (2013.01); *G06F 17/30911* (2013.01)
(58) Field of Classification Search
CPC ................ G06F 17/30935; G06F 17/30911
See application file for complete search history.

(56) References Cited

U.S. PATENT DOCUMENTS

| 5,606,688 | A | * | 2/1997 | McNutt et al. | 711/170 |
| 5,887,167 | A | | 3/1999 | Sutton | |
| 6,029,163 | A | | 2/2000 | Ziauddin | 707/2 |
| 6,766,318 | B1 | * | 7/2004 | Guay et al. | 707/688 |
| 6,996,576 | B2 | | 2/2006 | Vos et al. | 707/103 R |
| 7,051,013 | B2 | | 5/2006 | Horman et al. | 707/2 |
| 7,133,400 | B1 | | 11/2006 | Henderson et al. | 370/389 |
| 7,139,749 | B2 | | 11/2006 | Bossman et al. | 707/3 |
| 7,302,449 | B2 | | 11/2007 | Vos et al. | 707/103 R |

(Continued)

OTHER PUBLICATIONS

"Bloom Filter-based XML Packets Filtering for Millions of Path Queries" (hereinafter NPL-DOC) dated Mar. 9, 2005.*

(Continued)

*Primary Examiner* — Tarek Chbouki
(74) *Attorney, Agent, or Firm* — Fleit Gibbons Gutman Bongini & Bianco PL; Thomas Grzesik

(57) ABSTRACT

A method, system, and computer readable medium for collecting statistics associated with data in a database are disclosed. The computer readable medium implements the method comprises determining an amount of memory needed to collect statistics for data associated with a defined data type in a relational database. The defined data type is based upon a mark-up language using a tree structure with one or more root-to-node paths therein. The amount of memory is allocated as determined for collecting the statistics for the data of the defined data type. A statistics collection is performed for the data of the defined data type in a single pass through the database and within the amount of memory which has been allocated. The performing includes at least determining a total number of instances of at least one path-identifier associated with a given value within a given set of documents.

17 Claims, 8 Drawing Sheets

(56) References Cited

U.S. PATENT DOCUMENTS

| | | |
|---|---|---|
| 7,617,201 B1* | 11/2009 | Bedell et al. .......................... 1/1 |
| 7,930,277 B2* | 4/2011 | Ge et al. ......................... 707/688 |
| 2003/0158842 A1 | 8/2003 | Levy et al. ......................... 707/3 |
| 2004/0054569 A1* | 3/2004 | Pombo et al. ..................... 705/7 |
| 2004/0068435 A1* | 4/2004 | Braunzell ....................... 705/14 |
| 2004/0111410 A1* | 6/2004 | Burgoon et al. ................. 707/4 |
| 2004/0128290 A1* | 7/2004 | Haas et al. ....................... 707/5 |
| 2004/0128296 A1* | 7/2004 | Krishnamurthy et al. .... 707/100 |
| 2004/0221229 A1* | 11/2004 | Perry ........................... 715/514 |
| 2004/0267691 A1 | 12/2004 | Vasudeva .......................... 707/1 |
| 2005/0038785 A1* | 2/2005 | Agrawal et al. ................... 707/6 |
| 2005/0050016 A1* | 3/2005 | Stanoi et al. ...................... 707/3 |
| 2005/0086639 A1* | 4/2005 | Min et al. ....................... 717/114 |
| 2006/0005122 A1* | 1/2006 | Lemoine ....................... 715/513 |
| 2006/0106746 A1 | 5/2006 | Stuhec ............................... 707/1 |
| 2007/0043696 A1* | 2/2007 | Haas et al. ....................... 707/2 |
| 2007/0271218 A1* | 11/2007 | Lim et al. ......................... 707/2 |
| 2007/0291757 A1 | 12/2007 | Dobson et al. ................ 370/392 |
| 2010/0011030 A1 | 1/2010 | Lim et al. |

OTHER PUBLICATIONS

Office Action dated Sep. 9, 2011 for U.S. Appl. No. 12/557,804.

* cited by examiner

STATISTICS COLLECTION USING PATH-VALUE PAIRS FOR RELATIONAL DATABASES

CROSS REFERENCE TO RELATED APPLICATION

The present patent application is a continuation of U.S. patent application Ser. No. 11/435,353 now U.S. Pat. No. 7,472,108, which was filed on May 16, 2006 and commonly assigned herewith to International Business Machines, which is hereby incorporated by reference in its entirety. Further, this application is related to the inventor's application "STATISTICS COLLECTION USING PATH-IDENTIFIERS FOR RELATIONAL DATABASES", U.S. Ser. No. 11/435,017 now U.S. Pat. No. 7,613,682, which was filed on the same day as the present application and commonly assigned herewith to International Business Machines Corporation. This related application is incorporated herein by reference in its entirety.

FIELD OF THE INVENTION

The present invention generally relates to the field of databases, and more particularly relates to collecting statistics associated with data in a database.

BACKGROUND OF THE INVENTION

Mark-up languages such as XML have become popular for managing data that is stored in databases. Therefore, relational databases have evolved into hybrid systems that store both relational data and XML data. In fact, in more recent versions of International Business Machine's DB/2 Database, XML was introduced as a data type. Moreover, SQL/XML and XQuery are new query languages on he XML data type. Optimization of search queries for the XML data type stored in database often relies on using statistics. These statistics help bound searches and queries.

However, one problem with optimizing queries using the XML data type is determining which statistics to collect. Another problem with optimizing queries using the XML data type is how to collect statistics in a bounded memory space. Still another problem with optimizing queries with the XML data type is estimating the cardinality of paths within database.

Therefore a need exists to overcome the problems with the prior art as discussed above.

SUMMARY OF THE INVENTION

Briefly, in accordance with the present invention, disclosed are a system, method, and computer readable medium for collecting statistics associated with data in a database are disclosed. The method comprises determining an amount of memory needed to collect statistics for data associated with a defined data type in a relational database. The defined data type is based upon a mark-up language using a tree structure with one or more root-to-node paths therein. The amount of memory is allocated as determined for collecting the statistics for the data of the defined data type. A statistics collection is performed for the data of the defined data type in a single pass through the database and within the amount of memory which has been allocated. The performing includes at least determining a total number of instances of at least one path-identifier associated with a given value within a given set of documents.

In another embodiment of the present invention, a system for collecting statistics associated with data in a database is disclosed. The system comprises a memory estimator for determining an amount of memory needed to collect statistics for data associated with a defined data type in a relational database. The defined data type is based upon a mark-up language using a tree structure with one or more root-to-node paths therein. A memory allocator for allocating the amount of memory as determined for collecting the statistics for the data of the defined data type is also included in the system. The system further comprises a statistics collector for performing a collection of statistics for the data of the defined data type in a single pass through the database and within the amount of memory which has been allocated. The statistics collector also determines at least a total number of instances of at least one path-identifier associated with a given value within a given set of documents.

In yet another embodiment of the present invention, a computer readable medium for collecting statistics associated with data in a database is disclosed. The computer readable medium comprises instructions for determining an amount of memory needed to collect statistics for data associated with a defined data type in a relational database. The defined data type is based upon a mark-up language using a tree structure with one or more root-to-node paths therein. The amount of memory is allocated as determined for collecting the statistics for the data of the defined data type. A statistics collection is performed for the data of the defined data type in a single pass through the database and within the amount of memory which has been allocated. The performing includes at least determining a total number of instances of at least one path-identifier associated with a given value within a given set of documents.

One advantage of the present invention is that statistics for a data type represented in a mark-up language such as XML can be collected more efficiently in a relational database. Another advantage is that the statistics collecting procedure is performed within a given amount of memory. Yet another advantage is that the statistics for the data type are collected within a single pass of a database table.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
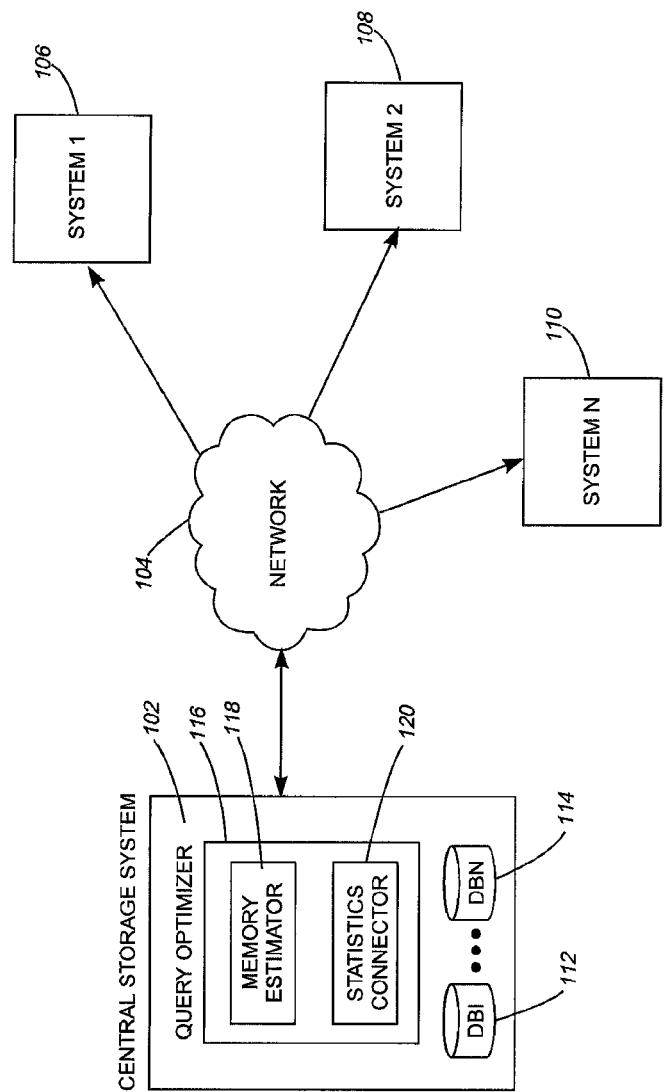
FIG. 1 is a block diagram illustrating an exemplary system, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary System

According to an embodiment of the present invention, as shown in FIG. 1, an exemplary system 100 for collecting statistics associated with data in a database is shown. In one embodiment, the system 100 includes a central storage system 102, a network 104, and one or more information processing systems 106, 108, 110. The network 104, in one embodiment, is a wide area network, local area network, wireless network, and the like.

The central storage system 102 includes one or more databases 112, 114. In one embodiment, the databases 112, 114 are hybrid databases with relational capabilities and comprehensive native support for mark-up languages such as extensible mark-up language ("XML"). It should be noted that although the present discussion is directed towards XML other mark-up language can apply. The central storage system 102 also includes a query optimizer 116 for optimizing queries received from the information processing systems 106, 108, 110. In one embodiment, the query optimizer 116 is a cost-based optimizer that enumerates search space by generating feasible query execution plans, collects statistics, and estimates cardinality and cost of the plans using the statistics. The query optimizer 116, based on the estimated costs, chooses the best query execution plan.

The query optimizer 116, in one embodiment, includes a memory estimator 118 and statistics collector 120. The memory estimator 118 estimates the amount of memory needed for collecting XML statistics and is discussed in greater detail below. The statistics collector 120 collects statistics related to data in the database. The statistics collector 120, in one embodiment, can collect statistics for both relational data and XML data. The statistics collector 120 is discussed in greater detail below.

Although shown as residing in the query optimizer, the memory estimator 118, and the statistics collector 120, in one embodiment, resides outside of the query optimizer 116 within the central storage system 102. In another embodiment, the memory estimator 118 and/or the statistics collector 120, in one embodiment, reside on one or more remote systems such as the information processing systems 106, 108, 110. Additionally, the functions of the memory estimator 118 and the statistics collector 120, in one embodiment, can be performed by a single component.

Exemplary Central Storage System

Figure 2:
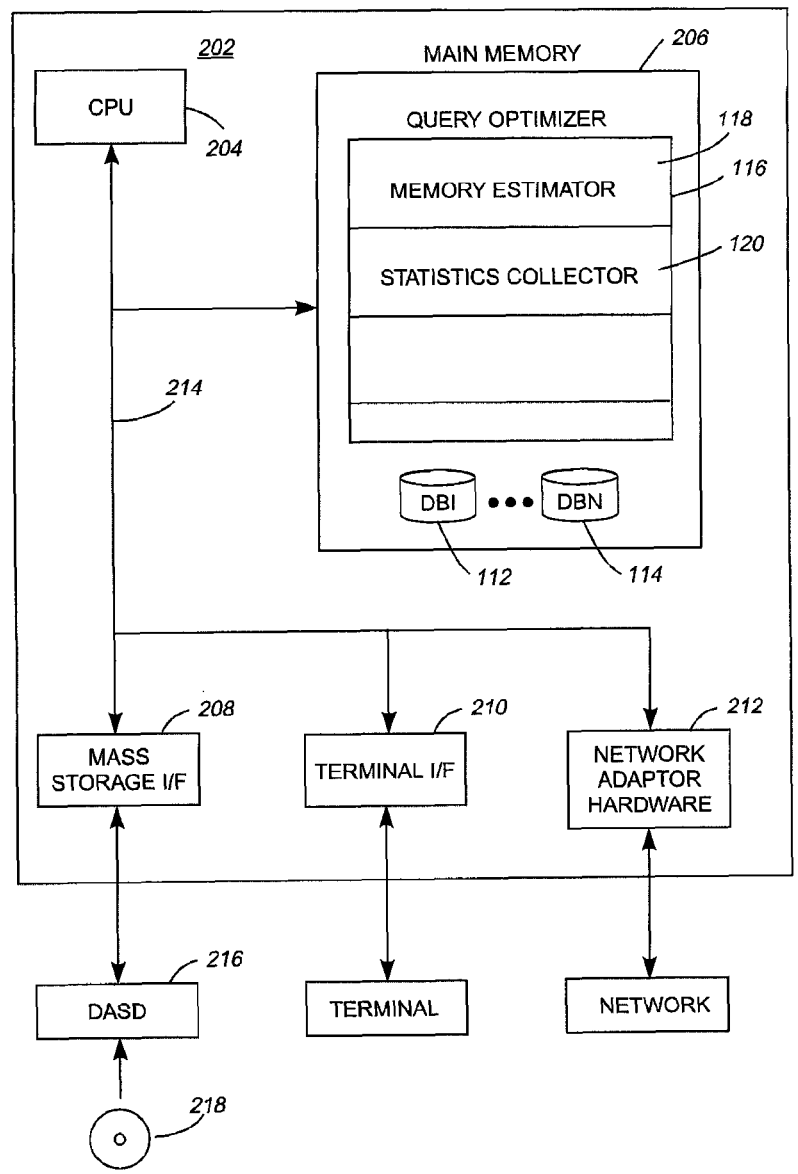
FIG. 2 is a block diagram illustrating a more detailed view of an information processing system, according to an embodiment of the present invention.

FIG. 2 is a block diagram illustrating a more detailed view of the central storage system 102, according to the present invention. The central storage system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like. The central storage system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the central storage system 102 system. One specific type of data storage device is a computer readable medium such as a floppy disk drive, which may be used to store data to and read data from a CD 218 or a floppy diskette (not shown). Another type of data storage device is a data storage device configured to support, for example, NTFS type file system operations.

The main memory 206 comprises databases 112, 114, which in one embodiment, comprise both relational data and XML data. The main memory 206 also includes the query optimizer 116. As discussed above, the query optimizer 116 includes the memory estimator 118. Prior to statistics collector 120 collecting statistics for XML data, the memory estimator 118 estimates the amount of memory needed for performing the XML statistics collection. For example, for each XML column in a database table, the memory estimator 118 estimates the amount of memory for the data members required for an XML statistics collecting routine. The memory estimator 118 also determines the amount of memory required for a number of reservoirs and the work areas of each reservoir. Reservoirs, for example, are data members of an XML statistics collecting routine that are used in collecting specific XML statistics. The memory estimator 118 also determines the amount of memory needed for any filters that are to be used in the statistics collecting process. The number of distinct path-identifiers that reach a value are also used in estimating the amount of required memory. It should be noted that this is not an exhaustive list of what is used by the memory estimator 118 for estimating the total amount of memory for the XML statistics collecting process. Once the memory estimator 118 determines the memory needed to collect the XML statistics, the required memory is allocated to the statistic collecting procedure. The XML statistics collector 122 collects the statistics within the allocated memory.

Bounding the memory for the statistics collecting procedure is advantageous because the statistics are collected while the database 112, 114 is live. If the required amount of memory is not determined before the statistics collecting procedure starts, the procedure can run out of memory during run time and need to abort. By estimating the amount of required memory beforehand, the memory estimator 118 can determine if the required memory is available. If the required amount of memory is not available, the user, in one embodiment, is prompted to allocate more memory for the statistics collecting procedure.

The statistics collector 120 collects database table statistics through a traditional table scan operation. One method for collecting statistics is described in Patricia G. Selinger, Morton M. Astrahan, Donald D. Chamberlin, Raymond A. Lorie, Thomas G. Price: *Access Path Selection in a Relational Database Management System. SIGMOD Conference* 1979: 23-34, which is hereby incorporated by reference in its entirety. At each row of the database table, each column in the row is processed. If a column is of XML type, the statistics collector 120 performs an XML statistics collection procedure. Each XML document is traversed so that the relevant XML statistics can be collected. In one embodiment, path distribution statistics and path-value distribution statistics are collected.

For each XML column in the database table, the statistics collector 120 collects frequency distribution of all distinct root-to-node paths that appear in a given XML column. Each root-to-node path, in one embodiment, is associated with a path-identifier. Some root-to-node paths may occur more frequently than other paths. Therefore, for the top k1 (given number of) most frequently occurring path-identifiers (i.e. root-to-node paths) the statistics collector 120 counts, for each frequent path, the number of documents (i.e. rows) that include the path-identifier. The statistics collector 120 also counts, for each of the most frequent path-identifiers, how many times the corresponding root-to-node path appears in the XML column, e.g. node count. For example, if five documents exist in an XML column and a path /a/b appears in only two of the documents, doc1 and doc2, a document count for the path /a/b is two. If the path /a/b appears twice in document doc1 and three times in document doc2, the node count for the path is five.

Because an XML column is logically a collection that includes "similar" XML documents in most instances, the number of distinct path-identifiers in a given a column is usually small. As a result, as long as the parameter k1 is not too small, the top-k1 pairs (e.g. path-identifier, document count and path-identifier, node count) usually cover all distinct path-identifiers in the column. If the number of distinct path-identifiers in a column is large, only the exact counts for the popular path-identifiers are stored.

In one embodiment, the statistics collector 120 collects a "catch-all" bucket for all of the path-identifiers in the given XML column. For the "catch-all" bucket the statistics collector 122 counts the number of unique path-identifiers in the current column. One method of estimating the number of unique paths is described in M. Astrahan, M. Schkolnick, and K.-Y. Whang. *Approximating the number of unique values of an attribute without sorting. Information Systems,* 12(1):11-15, 1987. 147, which is hereby incorporated by reference in its entirety. The statistics collector 120 also counts the total number of nodes in the current column. A document count sum is also calculated by the statistics collector 120. For example, the number of documents that each unique path occurs in is counted and these numbers are added together to get a document count sum.

As described above, the statistics collector 120 also collects path-value distribution statistics. The statistics collector 120, for the top k2 (given number of) most frequently occurring path-identifiers associated with a value (e.g. text, number, and the like) counts for each frequent path-identifier the number of documents (i.e. rows) that include the path-identifier. The statistics collector 120 also counts, for each of the most frequent path-identifiers, how many times the corresponding root-to-node path/value pair appears in the XML column, e.g. node count.

In one embodiment, the statistics collector 120 also collects a "catch-all" bucket for each path-identifier associated with a path that reaches a value. For the "catch-all" bucket, the statistics collector 120 counts the number of distinct values for each unique path that reaches a value in the current column. One method for estimating the number of distinct values is described in M. Astrahan, M. Schkolnick, and K.-Y. Whang. *Approximating the number of unique values of an attribute without sorting. Information Systems,* 12(1):11-15, 1987. 147, which is hereby incorporated by reference in its entirety. For example, if a path a/b/ exists in the current column and has the following occurrences /a/b=3, /a/b=4, /a/b=5, /a/b=7 the number of distinct values is 4. The second highest and lowest value associated with the current path is also determined by the statistics collector 120. Also, for each value associated with the current path, the statistics collector 120 counts the number of times that each value occurs in the column. This allows the statistics collector 120 to determine a value count sum. The number of documents that each value occurs is also counted by the statistics collector to determine a document count sum.

In one embodiment, the statistics collector 120 uses sampling to collect the above mentioned statistics for XML data types. Sampling improves the performance of the statistics collection. The statistics collector, in one embodiment, uses two-stage sampling method. For example, document-level and reservoir sampling methods are used. For document-level sampling, a user can select row-level/page-level sampling on XML columns. If a user chooses either one of these sampling levels a first level sampling result is yielded, which includes a set of sampled XML documents. If the user chooses not to run document-level sampling, reservoir sampling is performed on all of the XML documents.

Reservoir sampling, in one embodiment, is used to obtain four reservoirs, which are sampling arrays used to store sampled entries. Reservoir sampling is more fully described in Jeffrey Scott Vitter: *Random Sampling with a Reservoir.* ACM Trans. Math. Softw. 11(1): 37-57 (1985), which is hereby incorporated by reference in its entirety. As each XML document is traversed by the statistics collector 120, each path-identifier is sent to a first reservoir, e.g. a reservoir for path-identifiers at the node level ("Rpn"). A second reservoir, e.g. a reservoir for path-identifiers at the document level ("Rpd") receives only unique path-identifiers. For example, the Rpd reservoir does not receive duplicate path-identifiers. This is accomplished, in one embodiment, by using a filter such as a bloom filter. Bloom filters are more fully describe in Burton Bloom, *Space/time trade-offs in hash coding with allowable errors, CACM,* 13(7):422-426, July 1970, which is hereby incorporated by reference in its entirety.

Only the path-identifiers that pass the bloom filter are added to the Rpd. Similarly, each path-identifier that is associated with a given value is passed to a third reservoir, e.g. a reservoir for a path-identifier-value at the node level ("Rpvn"). Unique path-identifiers that are associated with a given value are added to a fourth reservoir, e.g. a reservoir for a path-identifier-value at the document level ("Rpvd"). A second bloom filter is used to ensure that a duplicate path-identifier associated with a value is not passed to the Rpvd. In one embodiment, the bloom filters are reset upon starting traversal of a new document. It should be noted that only two bloom filters are needed for the entire database table.

Each reservoir is summarized and extrapolated to obtain specific counts. For example, by summarizing the Rpn, a given number of the most frequently occurring path-identifiers can be identified according to a node count. By summarizing the Rpd, a given number of the most frequently occurring path-identifiers can be identified according to a document count. Summarizing the Rpvn yields a given number of the most frequently occurring path-identifiers associated with a given value according to a node count. By summarizing the Rpvd a given number of the most frequently occurring path-identifiers associated with a given value can be identified according to a document count. The number of distinct path-identifiers for the "catch-all" bucket associated with the path-identifiers and the number of the distinct values for the "catch-all" bucket associated with the path-identifiers reaching a value can also be determined from the reservoirs. When the statistics collector 120 finishes collecting and summarizing the statistics, a system catalogue is updated with the statistics. The query optimizer 116 uses these statistics when determining access paths to the data. In one embodiment, similar actions are performed to estimate a node count and a document of path-identifiers associated with a value in a given value range.

Although illustrated as concurrently resident in the main memory 206, it is clear that respective components of the main memory 206 are not required to be completely resident in the main memory 206 at all times or even at the same time. In one embodiment, the central storage system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the central storage system 102.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 220 to computer 202 to provide a user interface to the computer 202. These terminals 220, which are able to be non-intelligent or fully programmable workstations, are used to allow system administrators and users to communicate with the central storage g system 102. The terminal 220 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the central storage 102. The network adapter hardware 212 is used to provide an interface to the network 104. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 218, CD ROM, or other form of recordable media, or via any type of electronic transmission mechanism.

Exemplary Logic Flow Diagram

Figure 3:
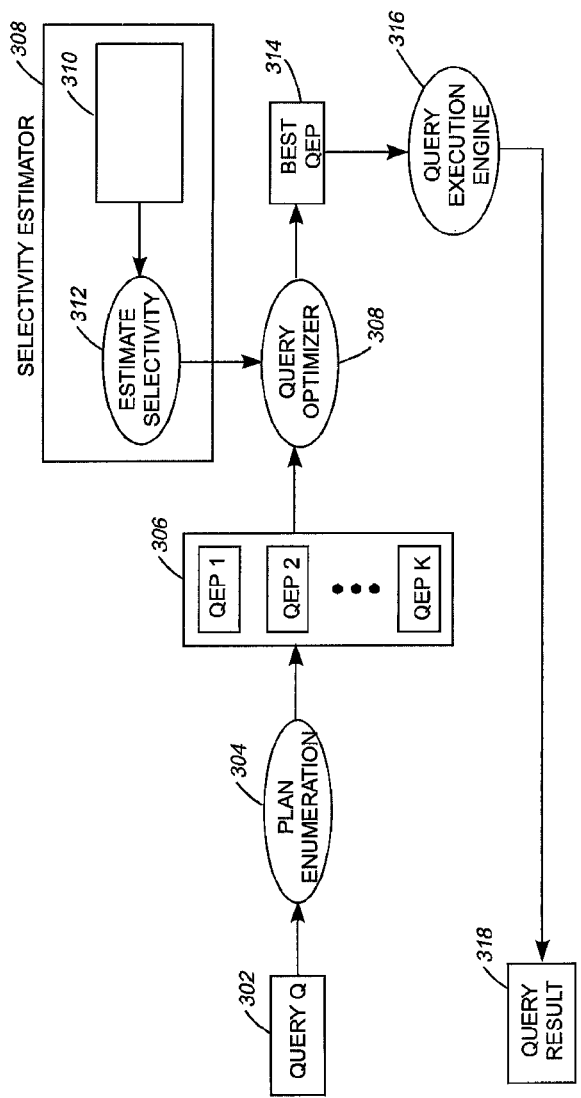
FIG. 3 is a logic flow diagram for optimizing queries execution plans, according to an embodiment of the present invention.

FIG. 3 illustrates a logic flow diagram 300 for generating an optimal query execution plan, based at least in part on statistics collected about data in the database 112, 114. A query Q 302 is transmitted by an information processing system 106, 108, 110 and is received at the database 112, 114. A query plan enumerator 304 generates a set of query execution plans 306 for executing the query. A selectivity estimator 308, using the statistics discussed above, estimates the selectivity or cardinality of the data in the database 112, 114 and passes this estimation to the query optimizer 116. The query optimizer 116 using the estimated cardinality, which was determined from the collected statistics, selects the optimal query execution plan 314. In one embodiment, the query optimizer 116 is a cost-based optimizer and therefore chooses an optimal query execution plan based on cost. The optimal query execution plan 314 is passed to a query execution engine 316, which yields a query result 318.

Exemplary Root-To-Node Paths

Figure 4:
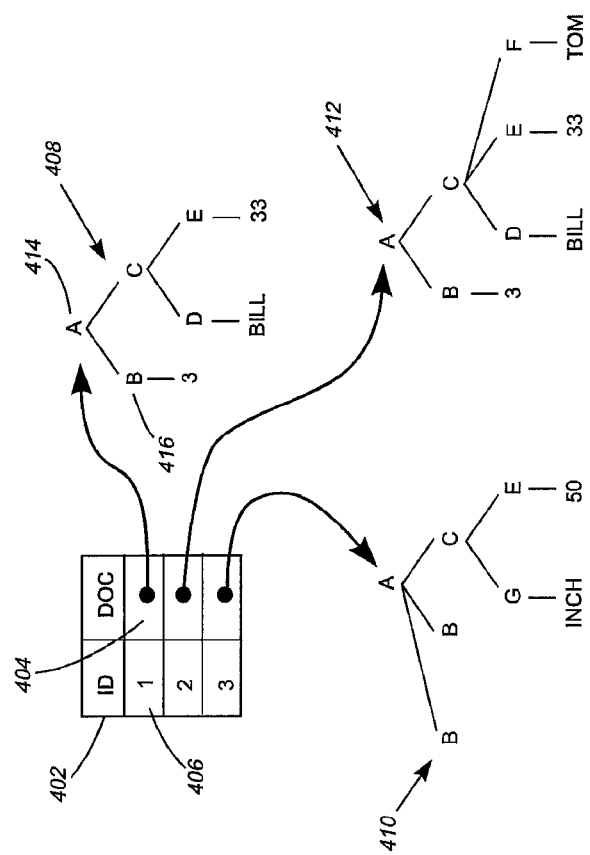
FIG. 4 is a graphical representation of root-to-node paths for an XML document, according to an embodiment of the present invention.

FIG. 4 illustrates exemplary root-to-node paths for different XML documents. FIG. 4 shows a partial XML column 402 for a database table. The partial XML column 402 comprises rows 404 with an XML document and a document ID 406. The path trees 408, 410, 412 represent the structure of XML data in the respective document. A path from the root of the XML document is represented by each node 414 in the path 408, 410, 412. A root element of the document is represented by a root node 416.

As discussed above, the statistics collector 120 processes each document in a column to collect the relevant statistics. For example, if the parameter k1 is three, the statistics collector 120 determines a path node count, path document count, path-value node count and path value-document count for the three most frequently occurring paths. Using the path trees 408, 410, 412 in FIG. 4 as an example, the three most frequently occurring paths are /A/B, /A, and /A/C/E. The path node count for the path /A/B is 4 because this path occurs four times in the column. The path node count for the path /A is 3 and the path node count for /A/C/E is also 3. The path document count for the path /A/B is 3 because the path occurs in three documents. The path document counts for the paths /A and /A/C/E is also 3.

A path-value node count, as discussed above, is the number of times a particular path associated with a given values occurs in a column. For example, the path-value node count for the path A/C/E=33 is 2 because this path and value occur two times in the column. The path-value document count is the number of documents that a path and its associated value occur in. For example, the path-vale document count for the path /A/C/E=33 is 2 because this path and value occur in two documents. As can be seen, the statistics collector 120 collects exact values for the given number of most frequently occurring paths. However, as discussed above, a "catch-all" bucket is collected for all of the path-identifiers (e.g. paths). The statistics collector 120 collects the number of distinct paths, sum of the node counts, and sum of the document counts. For example, the number of distinct paths /A, /A/B, /A/C, A/C/D, /A/C/E, /A/C/@G, /A/C/F is 7 in the example of FIG. 4. The sum of the node counts (A, A, A, B, B, B, B, C, C, C, D, E, E, E, F, F, @G) is 17.

The sum of the document counts is 15. For example, /A occurs in 3 documents, /A/B occurs in 3 documents, /A/C occurs in 3 documents, /A/C/D occurs in 1 document, /A/C/E occurs in 3 documents, /A/C/@G occurs in 1 document, and /A/C/F occurs in 1 document. The statistics collector 120 also collects a "catch-all" bucket for each path that reaches a value. For example, for the path /A/B, the statistics collects 120 counts the number of distinct values (3, 4, 5, 7), which is 4. The second highest value, i.e. 5, and the second lowest value, i.e. 4, are also determined. The sum of the value counts, as discussed above, for the path /A/B is 4. For example, the value 3 occurs one time, the value 4 occurs one time, the value 5 occurs one time, and the value 7 occurs one time. The sum of the document count, as discussed above, for the path /A/B is 4. For example, the value 3 occurs in one document, the value 4 occurs in one document, the value 5 occurs in one document and the value 7 occurs in one document. These calculations of repeated by the statistics collector for the path /A/C/D, /A/C/E, /A/C/F, and /A/C/@G.

Exemplary Process For Collecting Statistics

Figure 5:
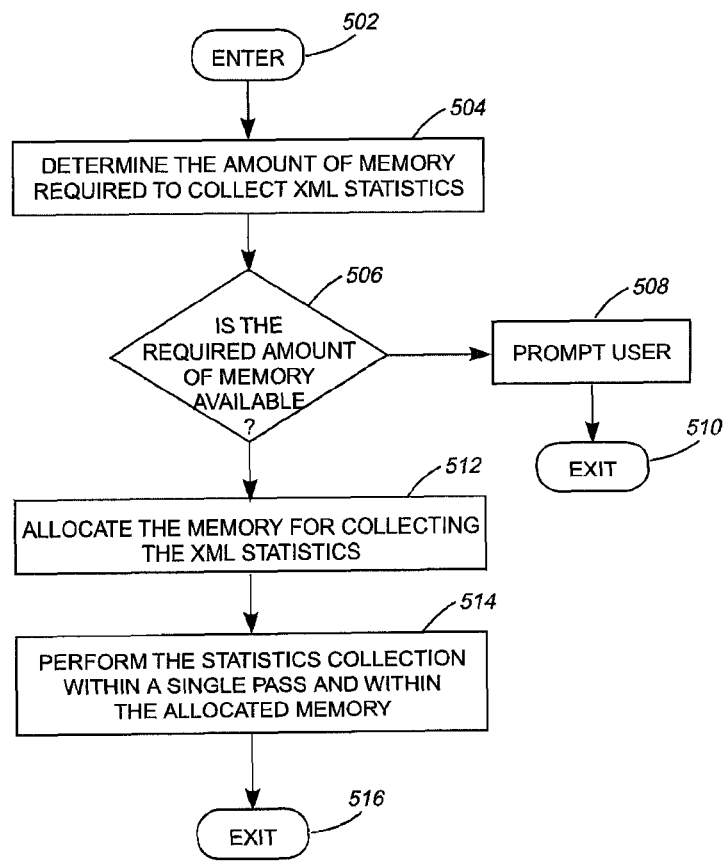
FIG. 5 is an operational flow diagram illustrating an overall exemplary process of collecting statistics for a database, according to the present invention.

FIG. 5 shows an over process for collecting statistics for data in a database 112, 114. The operational flow diagram of FIG. 5 begins at step 502 and flows directly to step 504. The memory estimator 118, at step 504, determines the amount of memory required to collect XML statistics. For example, the memory estimator analyzes the number of distinct paths that reach a value to determine the amount of memory needed for path-value "catch-all" buckets. This is only one example of what the memory estimator uses in calculating the total amount of memory required to collect XML statistics. The memory estimator 118, at step 506, determines if the required amount of memory is available. If the result of this determination is negative, a user is prompted, at step 508, to either allocate more memory or abort the collection process. The control flow then exits at step 510.

If the result of this determination is positive, the required memory, at step 512, is allocated to the statistics collecting process. The XML statistics, at step 514, are collected within the allocated amount memory and within a single pass of the database table. The control flow then exits at step 516. One advantage of the present invention is that the memory required for the XML statistics collection is determined before the process begins. This prevents the process from running out of memory during its operation. Also, because the database 112, 114 is live during the collection process, bounding the memory allows for efficient use of the database 112, 114. Collecting the statistics in a single pass allows the statistics to be collected quickly and efficiently.

An Exemplary Process of Collecting XML Statistics

Figure 6:
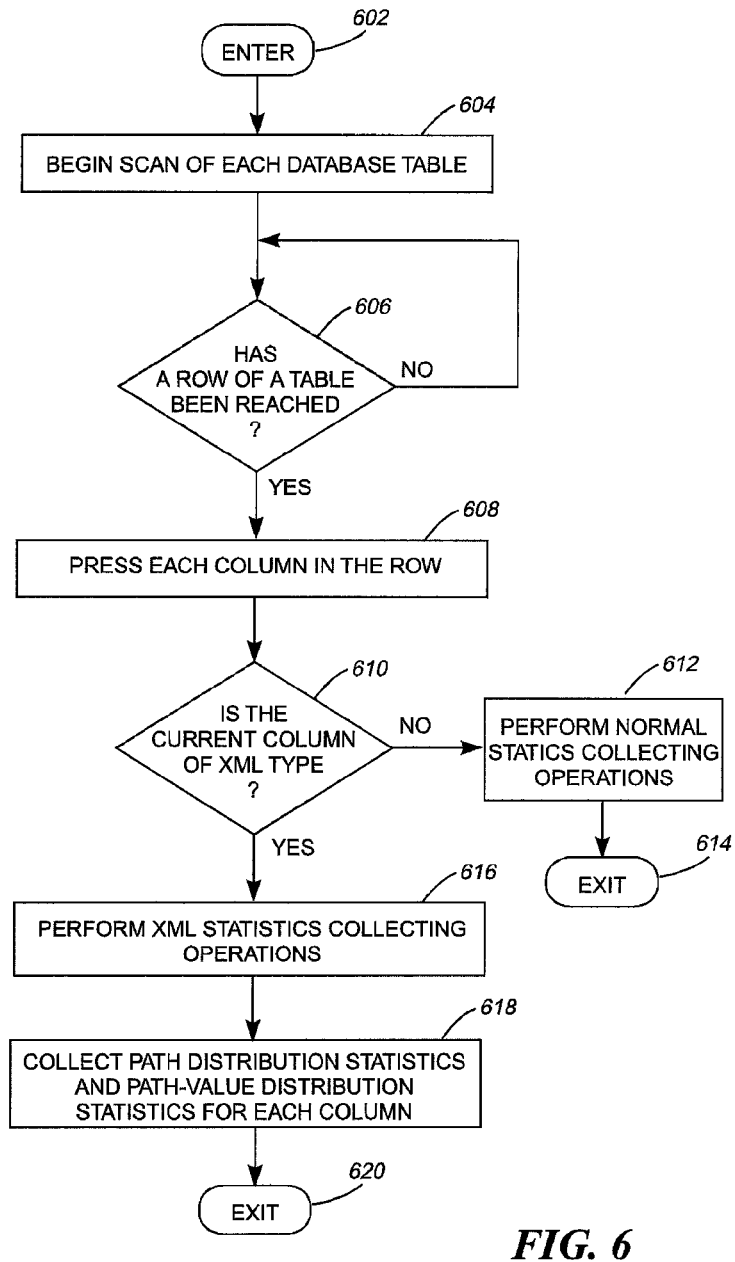
FIG. 6 is an operational flow diagram illustrating an exemplary process of collecting XML statistics, according to an embodiment of the present invention.

FIG. 6 shows an exemplary process of collecting XML statistics in a database 112, 114. The operational flow diagram of FIG. 6 begins at step 602 and flows directly to step 604. The statistics collector 120, at step 604, scans each table in a database 112, 114. The statistics collector 120, at step 606, determines if a row of a table has been reached. If the result of this determination is negative, the statistics collector 120 continues to monitor for a row.

If the result of this determination is positive, the statistics collector 120, at step 608, processes each column in the row. The statistics collector 120, at step 610, determines if the current column is of XML type. If the result of this determination if negative, normal statistics collecting operations, at step 612, are performed. The control flow then exits at step 614. If the result of this determination is positive, XML statistics collecting operations, at step 616, are performed. The statistics collector 120, at step 618, collects path distribution statistics and path-value distribution statistics for the current column. The control flow then exits, at step 620.

A More Detailed Process of Collecting XML Statistics

Figure 7:
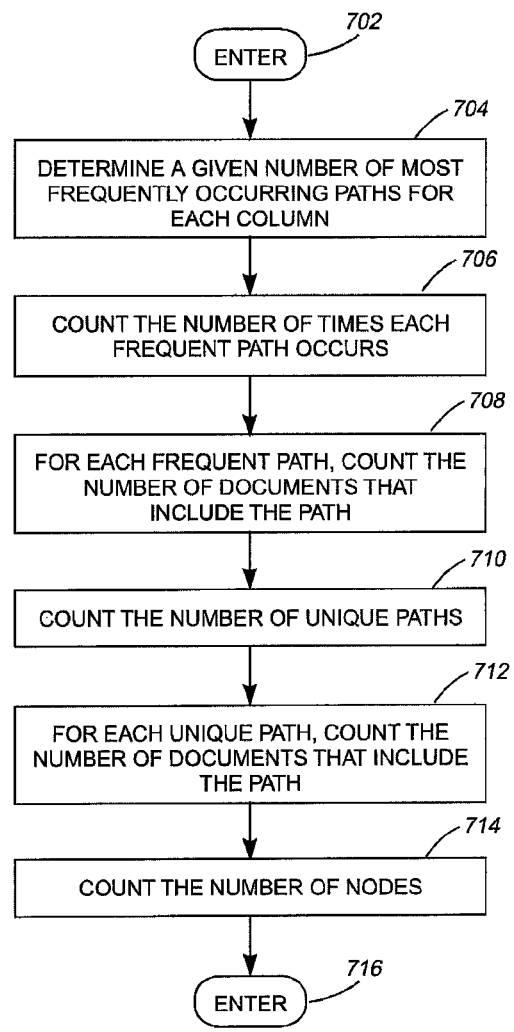
FIG. 7 is an operational flow diagram illustrating a more detailed process of collecting XML statistics, according to an embodiment of the present invention.

FIG. 7 shows a more detailed process of collecting XML statistics for data in a database 112, 114. FIG. 7 shows an exemplary process for collecting path distribution statistics. The operational flow diagram of FIG. 7 begins at step 702 and flows directly to step 704. The statistics collector 120, at step 704, determines a number of most frequently occurring paths for each column. The statistics collector 120, at step 706, counts the number of times that each frequent path occurs in the column to obtain a node count associated with each frequent path in the given number of frequent paths. For each frequent path, the statistics collector 120, at step 708, counts the number of documents that include the path to obtain a document count.

The number of unique paths, at step 710, is also counted by the statistics collector 120. The statistics collector 120, at step 712, counts for each unique path the number of documents that include the path to obtain a document sum count. The number of nodes in the column, at step 714, is also counted by the statistics collector 120. The control flow then exits at step 716. In one embodiment, unique paths are determined by using a bloom filter. As each path-identifier associated with a path is passed through a bloom filter, duplicate path-identifiers/path are prevented from being counted as a unique path. The statistics collected by the statistics collector 120, in one embodiment, are used by the query optimizer 116 for selecting an optimal query execution plan. For example, an optimal query execution plan can be one that minimizes the cost of executing a specific query.

Another More Detailed Process of Collecting XML Statistics

Figure 8:
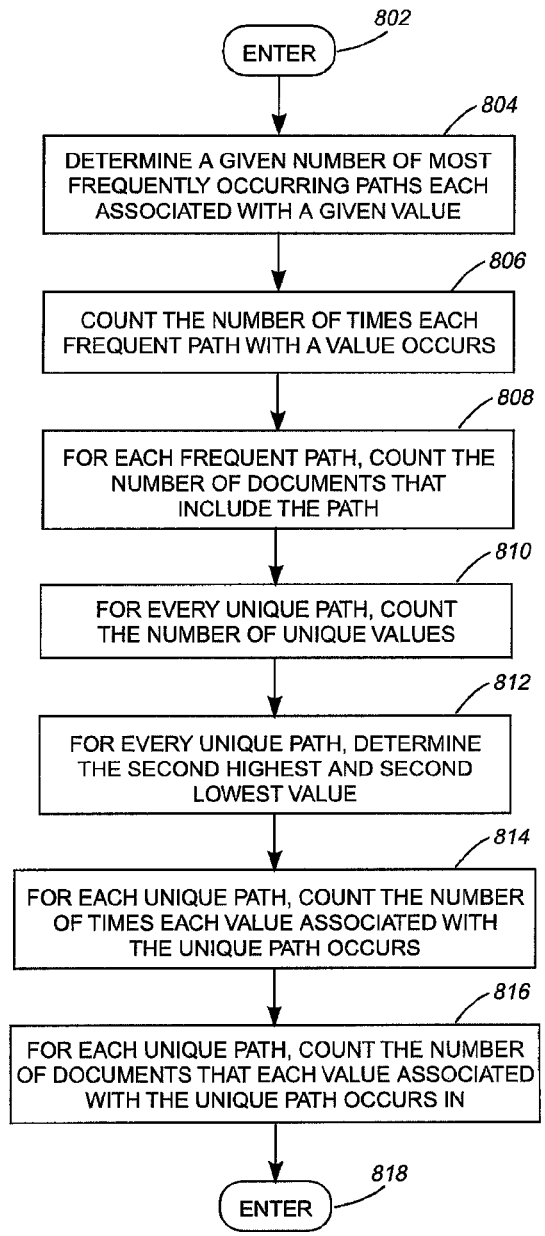
FIG. 8 is an operational flow diagram illustrating another exemplary process of collecting XML statistics, according to an embodiment of the present invention.

FIG. 8 shows a more detailed process of collecting XML statistics for data in a database 112, 114. FIG. 8 shows an exemplary process for collecting path-value distribution statistics. The operational flow diagram of FIG. 8 begins at step 802 and flows directly to step 804. The statistics collector 120, at step 804, determines a number of most frequently occurring paths that are each associated with a given value. For each frequent path with a value, the statistics collector 120, at step 806, counts the number of times that the frequent path with the value occurs in the current column to obtain a path-value node count. The statistics collector 120, at step 808, also counts the number of documents that include the frequent path with the value to obtain a path-value document count.

For each unique path, the statistics collector 120, at step 810, counts the number of unique values associated with the path. The second highest and lowest value for each unique path, at step 812, is also counted by the statistics collector 120. The statistics collector 120, at step 814, also counts for each unique path the number of times that each value associated with the unique path occurs to obtain a node sum count. For each unique path, the statistics collector 120, at step 816, also counts the number of documents that each value of the path occurs to obtain a document sum count. The control flow then exits at step 818. In one embodiment, unique paths associated with a value are determined by using a bloom filter. As each path-identifier associated with a path-value pair is passed through a bloom filter, duplicate path-identifiers associated with a path-value pair are prevented from being counted as a unique path-value pair.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, on an information processing system, for collecting statistics associated with data in a database, the method comprising:
    determining an amount of memory needed to perform a collection of statistics for data associated with a defined data type in a relational database, wherein the defined data type is based upon a mark-up language using a tree structure with one or more root-to-node paths therein, and wherein the statistics to be collected are based on the defined data type;
    allocating the amount of memory as determined for collecting the statistics for the data of the defined data type;
    performing a collection of statistics for the data of the defined data type in a single scan pass through the database, wherein the collection of statistics utilizes an amount of memory that is within the amount of memory which has been allocated, and wherein the performing includes at least:
    determining a total number of instances of at least one path-identifier associated with at least one value within a given set of documents, wherein the at least one path-identifier identifies a given root-to-node path within the given set of documents, and wherein the at least one path-identifier is a unique path-identifier and is one of a given number of most frequently occurring path-identifiers associated with a value in the given set of documents; and
    selecting an optimal query execution plan based on the statistics that have been collected.

2. The method of claim 1, wherein the determining the total number of instances further comprises:
    determining a total number of unique path-identifiers occurring in the given set of documents, wherein each unique path-identifier is associated with at least one value within the given set of documents.

3. The method of claim 1, wherein the performing the collection of statistics, further comprises:
    determining at least one of a node count and a document count for the path-identifier associated with the at least one value based on the total number of instances which have been determined.

4. The method of claim 1, wherein the performing the collection of statistics, further comprises:
    identifying, for each unique path-identifier within the given set of documents, each path associated with the unique path identifier associated with any value within the given set of documents; and
    determining a total number of unique values associated with each path.

5. The method of claim 1, wherein the performing the collection of statistics, further comprises performing at least one of:
    sampling at a document level, wherein the sampling comprises at least one of a row level sampling and a page level sampling; and
    sampling using at least one reservoir.

6. The method of claim 5, wherein the sampling using at least one reservoir comprises:
    traversing through at least one of
        sampled documents in a given set of documents, and
        all documents in the set of given set of documents
    for identifying at least one path-identifier associated with a given value;
    passing data associated with each path-identifier associated with the given value that has been identified to a first reservoir; and
    passing data associated with each identified path-identifier associated with the given value that has been identified and is unique within a particular document in the given set of documents to a second reservoir.

7. The method of claim 6, further comprising:
applying a first bloom filter to each path-identifier associated with the value prior to passing a path-identifier associated with the given value-to the second reservoir, thereby preventing a duplicate path-identifier associated with the given value within the particular document from being passed to a third reservoir.

8. The method of claim 6, further comprising:
summarizing the first reservoir for identifying a node count for determining a given number of most frequently occurring path-identifiers associated with the given value; and
summarizing the second reservoir for identifying a document count for determining the given number of most frequently occurring path-identifiers associated with the given value.

9. A system for collecting statistics associated with data in a database, the system comprising:
a memory capable of storing machine instructions; and
a processor in communication with the computer memory, said processor configured to access the memory, the processor performing;
determining an amount of memory needed to collect statistics for data associated with a defined data type in a relational database, wherein the defined data type is based upon a mark-up language using a tree structure with one or more root-to-node paths therein;
allocating the amount of memory as determined for collecting the statistics for the data of the defined data type;
performing a collection of statistics for the data of the defined data type in a single pass through the database and within the amount of memory which has been allocated and for at least determining a total number of instances of at least one path-identifier associated with a given value within a given set of documents;
traversing through at least one of
sampled documents in a given set of documents; and
all documents in the set of given set of documents for identifying at least one path-identifier associated with a value;
passing data associated with each path-identifier associated with a value that has been identified to a first reservoir;
passing data associated with each path-identifier associated with a value that has been identified and is unique within a particular document in the given set of documents to a second reservoir, wherein the first reservoir is summarized for identifying a node count for determining a given number of most frequently occurring path-identifiers associated with a given value within the given set of documents, and wherein the second reservoir is summarized for identifying a document count for determining the given number of most frequently occurring path-identifiers associated with the given value;
applying at least one bloom filter that to each path-identifier prior to passing the path-identifier to the second reservoir, thereby preventing a duplicate path-identifier within the particular document from being passed to the second reservoir; and
selecting an optimal query execution plan based on the statistics that have been collected.

10. The system of claim 9, wherein the path-identifier associated with the given value is one of a given number of most frequently occurring path-identifiers associated with a given value in the given set of documents.

11. The system of claim 9, wherein the method further comprises:
determining at least one of a node count and a document count for the path-identifier associated with the given value based on the total number of instances which have been determined; and
determining a total number of unique path-identifiers occurring in the set of given documents, wherein each unique path-identifier is associated with at least one given value within the given set of documents.

12. The system of claim 9, wherein the method further comprises:
identifying, for each unique path-identifier within the given set of documents, each path associated with the unique path identifier associated with a value within the given set of documents; and
determining a total number of unique values associated with each path.

13. The system of claim 9, wherein the method further comprises:
determining at least one of a second highest value and a second lowest value associated with each path-identifier within the given set of documents, wherein the second highest value is a next highest value after a first highest value, and wherein the second lowest value is a lowest value immediately preceding a first lowest value.

14. A non-transitory computer readable medium for collecting statistics associated with data in a database, the non-transitory computer readable medium comprising instructions for:
determining an amount of memory needed to perform a collection of statistics for data associated with a defined data type in a relational database, wherein the defined data type is based upon a mark-up language using a tree structure with one or more root-to-node paths therein, and wherein the statistics to be collected are based on the defined data type;
allocating the amount of memory as determined for collecting the statistics for the data of the defined data type;
performing a collection of statistics for the data of the defined data type in a single pass through the database, wherein the collection of statistics utilizes an amount of memory that is within the amount of memory which has been allocated, wherein the performing includes at least:
determining a total number of instances of at least one path-identifier associated with at least one value within a given set of documents, wherein the at least one path-identifier identifies a given root-to-node path within the given set of documents,
and wherein the at least one path-identifier is a unique path-identifier and is one of a given number of most frequently occurring path-identifiers associated with a value in the given set of documents; and
selecting an optimal query execution plan based on the statistics that have been collected.

15. The non-transitory computer readable medium of claim 14, wherein the instructions for performing the collection of statistics further comprise instructions for:
determining a total number of unique path-identifiers occurring in the given set of documents, wherein each unique path-identifier is associated with at least one value within the given set of documents; and
determining at least one of a node count and a document count for the path-identifier associated with the at least one value based on the total number of instances which have been determined.

16. The non-transitory computer readable medium of claim 14, wherein the instructions for performing the collection of statistics further comprise instructions for:
- identifying, for each unique path-identifier within the given set of documents, each path associated with the unique path identifier associated with any value within the given set of documents; and
- determining a total number of unique values associated with each path.

17. The non-transitory computer readable medium of claim 14, wherein the instructions for sampling using at least one reservoir further comprise instructions for:
- passing data associated with each path-identifier associated with the given value that has been identified to a first reservoir; and
- passing data associated with each identified path-identifier associated with the given value that has been identified and is unique within a particular document in the given set of documents to a second reservoir.

* * * * *